United States Patent
Jose et al.

(10) Patent No.: US 10,664,382 B2
(45) Date of Patent: May 26, 2020

(54) SYSTEM AND METHOD FOR TOOL CHAIN DATA CAPTURE THROUGH PARSER FOR EMPIRICAL DATA ANALYSIS

(71) Applicant: Tata Consultancy Services Limited, Mumbai (IN)

(72) Inventors: Alin Jose, Chennai (IN); Prabhu Arumugham, Chennai (IN); Ashokkumar Ganesan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/938,456

(22) Filed: Mar. 28, 2018

(65) Prior Publication Data

US 2019/0213105 A1    Jul. 11, 2019

(30) Foreign Application Priority Data

Jan. 10, 2018   (IN) .............................. 201821001183

(51) Int. Cl.
*G06F 9/44* (2018.01)
*G06F 11/36* (2006.01)
*G06F 8/41* (2018.01)

(52) U.S. Cl.
CPC .......... *G06F 11/3612* (2013.01); *G06F 8/427* (2013.01); *G06F 11/3604* (2013.01); *G06F 11/3692* (2013.01)

(58) Field of Classification Search
CPC .. G06F 8/427; G06F 11/3612; G06F 11/3604; G06F 11/3692

(Continued)

(56) References Cited

U.S. PATENT DOCUMENTS

| | | | |
|---|---|---|---|
| 6,405,364 B1 * | 6/2002 | Bowman-Amuah | ........................ G06Q 10/06 717/101 |
| 8,140,468 B2 * | 3/2012 | Kwok | .................... G06Q 10/10 382/195 |

(Continued)

OTHER PUBLICATIONS

Kumykov et al., "Development of an Operational Process for Continuous Delivery", 2016, Worcester Polytechnic Institute, Worcester, MA, 92 pages. (Year: 2016).*

(Continued)

*Primary Examiner* — Ted T. Vo
(74) *Attorney, Agent, or Firm* — Finnegan, Henderson, Farabow, Garrett & Dunner LLP (57) ABSTRACT

Multiple tools are used in the software development environment for automation of software build and to perform quality checks on code. However, because of an iterative software development process, multiple tests need to be performed using various tools resulting in a large number of test outputs at different points in time. This makes it difficult for users to get a composite view of quality parameters in one location. A system and method has been described to implement a parser to parse through output data generated by the various tools, extract measures data and measures values from the output data perform an analysis by receiving a user input on the results data to identify trends, generate a confidence parameter and a cross relation analysis to attribute to a probable cause of lapse in the software development stages and create a composite view of quality parameters of the software build.

12 Claims, 5 Drawing Sheets

(58) Field of Classification Search
USPC .......................................................... 717/131
See application file for complete search history.

(56) References Cited

U.S. PATENT DOCUMENTS

| | | | | |
|---|---|---|---|---|
| 9,787,779 | B2* | 10/2017 | Frank | ...................... H04L 67/16 |
| 10,324,822 | B1* | 6/2019 | Chopra | ............... G06F 11/3616 |
| 2003/0028503 | A1* | 2/2003 | Giuffrida | ................ G06F 16/30 |
| 2005/0223392 | A1* | 10/2005 | Cox | ........................ G06Q 10/06 |
| | | | | 719/328 |
| 2010/0229157 | A1* | 9/2010 | Ergan | ................. G06F 11/0748 |
| | | | | 717/128 |
| 2011/0153611 | A1* | 6/2011 | Ankisettipalli | ..... G06F 17/2247 |
| | | | | 707/740 |
| 2017/0235662 | A1 | 8/2017 | Leask | |

OTHER PUBLICATIONS

Cohen et al., "Android Application Development Processes and Tool Chains for Intel® Architecture", Aug. 2014, Springer Link, 42 pages. (Year: 2014).*

* cited by examiner

SYSTEM AND METHOD FOR TOOL CHAIN DATA CAPTURE THROUGH PARSER FOR EMPIRICAL DATA ANALYSIS

PRIORITY CLAIM

This U.S. patent application claims priority under 35 U.S.C. § 119 to: India Application No. 201821001183, filed on 10 Jan. 2018. The entire contents of the aforementioned application are incorporated herein by reference.

TECHNICAL FIELD

The embodiments herein generally relate to the field of software engineering, and more particularly, to a method and system for performing quality software delivery in an agile software development lifecycle.

BACKGROUND

Software application development is carried out using different methodologies such as agile and waterfall. Each of these methodologies recommend phases or stages through which software code is tested and validated using a plurality of tools. Today, the agile methodology is gaining popularity. Continuous software development refers to a process wherein the software code is iteratively subjected to continuous integration, testing and deployment. In each of these aspects, a variety of tools or instruments are used for automation to ensure quality of software and increase efficiency of the process.

Build automation is a process wherein the build creation of software code is automated, that is, code is compiled, packaged and several functional and non-functional tests are performed before it is deployed in a target environment. Various tools are available to perform build automation and also perform functional and non-functional tests. At this stage, a product owner will monitor the quality of the software build version—this can be cumbersome especially when a wide variety of tools iteratively test various parameters of a software build at different points in time. Further, in an agile mode, build go through multiple iterations and scaled agile further compound project operations. Also, when there is an occurrence of a failure, it is important to trace or roll back to the cause of failure, which could be at any stage in the development lifecycle.

Output produced by various tools are in different formats and also contain different metrics or measures which could be difficult to decipher. It becomes important to assess the build quality from a granular level to a package level before making a decision to deploy. A quality manager or a product owner cannot be really expected to go through multiple versions of test reports for a build version to determine or check quality as per a benchmark because there are many tools in continuous operation and many reports that are generated in various formats at multiple locations. Further, if a test is still running, the software development team would need to wait till the test is complete to receive a report. Currently, there are limited means available, that would be able to read, for example, raw data generated by a tool (before a final report) and then analyze to present an instant view of a build quality to the end user. There is a need to unify or create a composite view, whereby reports generated for functional and non-functional tests and other test aspects can be accessed and critical parameters can be presented in an intelligible format to decision makers at any point in time in the software development process. This view will help identify patterns and track improvements for a version of software build.

U.S. patent application Ser. No. 15/046,139 draws attention to generating a set of scores each for functional and non-functional scores and then create an integrated score to assess software quality. However, the method described in this application does not consider the plurality of tools used to assess quality parameters and deriving insights from those reports. In yet another patent, U.S. Pat. No. 9,514,426 B2 titled System and Method for Providing Enterprise IT Life Cycle Tools Synchronization Platform, describes a workflow based method to synchronize tools used in the software development lifecycle irrespective of technology—however, this patent does not consider the aspect of unifying report data generated by various tool sets used in the software development process to monitor and assess quality of a build.

Hence, there is a need to read, analyze and create a composite view of the output generated by the multiple tools in the toolchain employed in the software development lifecycle, to the software development team and key stake holders that indicates aspects of quality that can be useful insight from the output generated by these tools at any point in time for decision making, creating improvements, resolving and tracing errors and increasing efficiency of the development cycle.

SUMMARY

Embodiments of the present disclosure present technological improvements as solutions to one or more of the above-mentioned technical problems recognized by the inventors in conventional systems. For example, in one embodiment, a system for selective capturing of tool chain data for software build analysis has been provided. The system comprises a tool chain setup, a software development framework, a memory and a processor. The tool chain setup comprises a plurality of tools that are used in the software development framework and the output data generated by each tool respectively. The software development framework comprises a framework, that also incorporates stages or phases of software development using a plurality of tools from the toolchain setup in the software development and deployment process. The processor is further configured to perform the steps of parsing through a plurality of output data generated by a plurality of tools for a software deployment, wherein the tools are integrated with a plurality of stages in a deployment process, further wherein the parsing is performed by a parsing module to extract format data, measures data, and values of the measures data; performing an analysis of the data by an analysis module subsequent to parsing through the plurality of output data for a software build to generate a result data comprising trend analysis and cross relation to the plurality of stages in the deployment cycle; and generating an analysis report by the output module after receiving an input from the input receiving module and displaying the plurality of result data corresponding to the quality of the software build by an output module.

In another aspect of the embodiment herein provides a method for selective capturing of tool chain data for software build analysis. In the first step, output data generated by the plurality of tools in the toolchain setup is parsed by implementing a parser, wherein the parser reads through metadata of the output data generated by a plurality of tools. In the next step, the parsed data is processed to derive measures data and measures value to perform an analysis. Further, in the next step, a user input is received to perform analysis, wherein a benchmarking is performed with respect to the output data received from the tool chain setup, wherein benchmarking comprises performing a trend analysis and cross relation pattern analysis of the output data and with the empirical output data. Further, in the next step, the analyzed data is presented visually in the software development framework to the end users.

In another embodiment, a non-transitory computer-readable medium having embodied thereon a computer program for selective capturing of tool chain data for software build analysis. In the first step, output data generated by the plurality of tools in the toolchain setup is parsed by implementing a parser, wherein the parser reads through metadata of the output data generated by a plurality of tools. In the next step, the parsed data is processed to derive measures data and measures value to perform an analysis. Further, in the next step, a user input is received to perform analysis, wherein a benchmarking is performed with respect to the output data received from the tool chain setup, wherein benchmarking comprises performing a trend analysis and cross relation pattern analysis of the output data and with the empirical output data. Further, in the next step, the analyzed data is presented visually in the software development framework to the end users.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Figure 1:
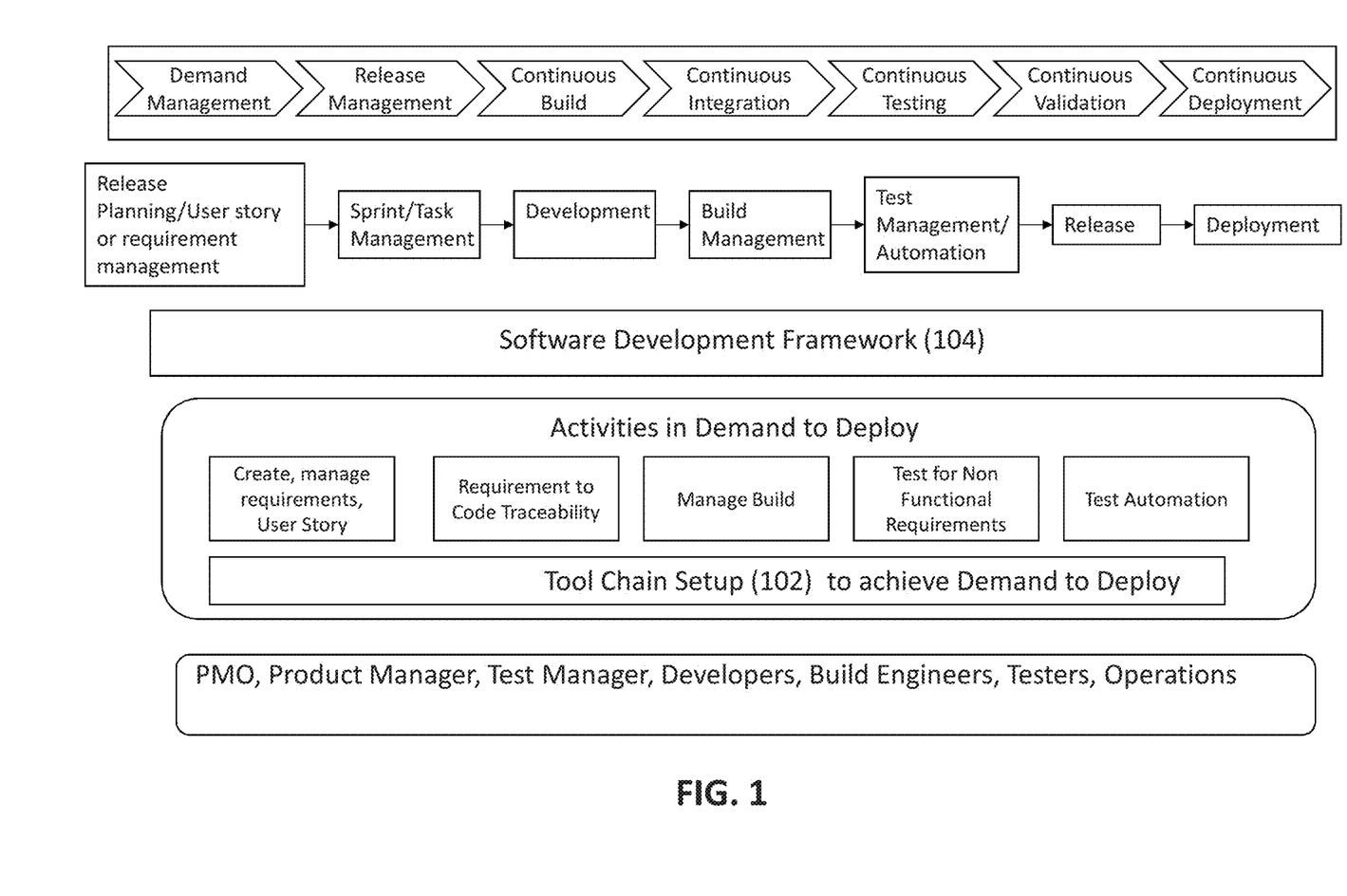
FIG. 1 illustrates a block diagram of the Demand to Deploy cycle of software delivery along with the various stages and activities, with the stake holders involved and the tools used in the process.
Figure 2:
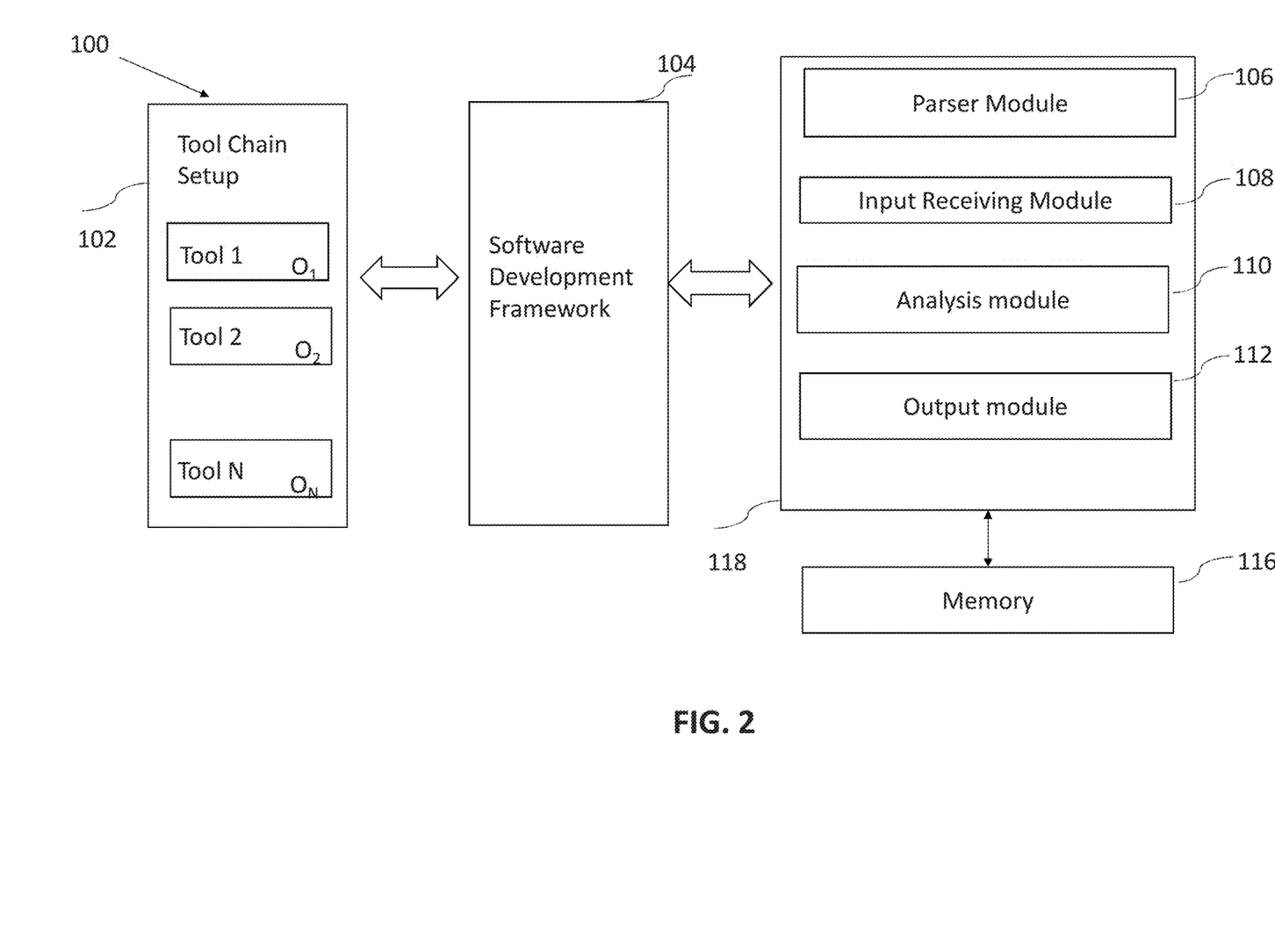
FIG. 2 illustrates a block diagram of a system tool chain data capture according to an embodiment of the present disclosure.

According to an embodiment of this disclosure, FIG. 1 illustrates a schematic of a demand to deploy cycle, wherein software is being developed by development teams through various stages of development, wherein each stage comprises various activities and a set of tools to automate these activities along with the stakeholders involved in each of these activities. FIG. 1, one can observe that a plurality of activities is a part of the software development cycle. The software development framework addresses activities pertaining to creating and managing user stories, managing the code to requirement traceability, managing software build and testing activities. The phases illustrated in FIG. 1 are typically used to roll-back to any stage in case of an error/failure in the demand to deploy cycle, According to an embodiment of the disclosure, a system 100 for tool chain data capture is shown in FIG. 2. The system 100 provides an integrated view of a plurality of software testing parameters that is carried out for various software builds. The system 100 can be used alongside a software development framework 104 using an agile methodology to enable developers to assess quality parameters of a software build by presenting a composite view.

According to an embodiment of the disclosure, the system 100 is configured to be implemented in an application software development environment. In a software development environment, software code needs to be tested for functional requirements as well the non-functional requirements need to be measured before deployment in multiple environments. Also, with increasing adoption of agile methodology, software code needs to be tested iteratively across defined time spans using various tools that are available in the software development environment. Hence, to measure the quality of software code in a build, an integrated view of the test results from various output generated by the tools needs to be presented to a product owner for the multiple quality checks that are being performed to be able to make a decision for deployment of code. This aspect becomes important at an enterprise level, when there are multiple agile teams working at a portfolio level on various product development, and where quality of the software code needs to be monitored, especially when there are many testing tools that test a version of the build across iterations.

Figure 2A:
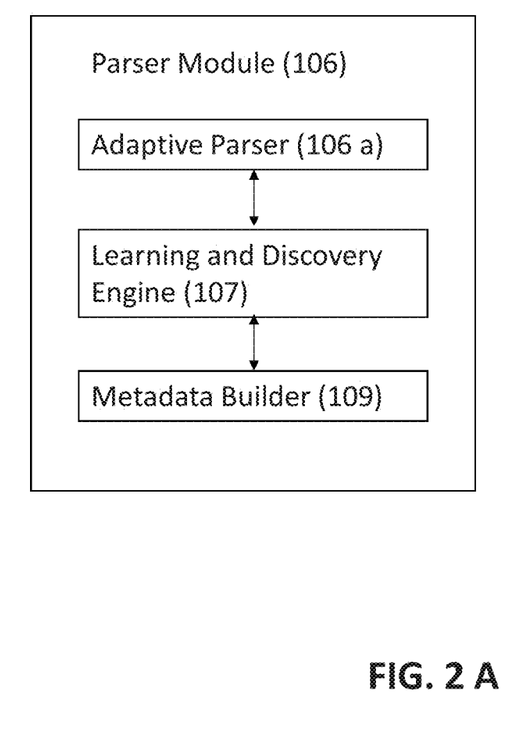
FIG. 2a illustrates a closer view of the block diagram of the system tool chain data capture according to an embodiment of the disclosure.

For the purpose of description in this disclosure, the system 100 is being explained in co-ordination with a software development framework 104 and a tool chain setup 102. According to an embodiment of the disclosure, the system 100 further comprises a memory 116 and a processor 118 as shown in the block diagram of FIG. 2. The processor 118 works in communication with the memory 116. The processor 118 further comprises a plurality of modules. The plurality of modules accesses the set of algorithms stored in the memory 116 to perform certain tasks. The processor 118 further comprises a parser module 106, an input receiving module 108, an analysis module 110, and an output module 112 as per the block diagram illustrated in FIG. 1. A closer view of the components of the parser module 106 are illustrated in FIG. 2A.

According to an embodiment of the disclosure, the software development framework 104 is configured by software development teams to develop application software through methodologies such as agile, devops and waterfall amongst a plurality of methodologies known in the art. The software development framework 104 is communicatively coupled with multiple tools that aid in the process of software development, which is represented by the tool chain setup 102. An enterprise may use many tools known in the art for various activities that comprise software development. For example—automated build generation, continuous integration, continuous testing of non-function requirements, performance, security, code check-in and the like. Tools are accessed by software development teams using application program interface (APIs) or through plugins for customization and configuration. Each of the tools represented in the tool chain setup 102 generate an output data (represented as $O_1, O_2, \ldots O_N$) in FIG. 1. Output data generated by the individual tools in the tool chain setup 102 is used for analysis. Output data generated by the tools can be in a plurality of formats, for example—raw data, console output, pre-analyzed data, data from log files generated, or finalized reports in tabular or document files. In addition, output data ($O_1$ to $O_N$) generated by the tool chain setup 102, also comprises report attributes based on the test criteria defined in an environment for the software code. In an embodiment, the test attributes can comprise for example, line of code, modules of code, percentage of code analyzed etc. as known the art.

Further, the tool chain setup 102, comprises a variety of tools for testing or validation of a plurality of aspects of code. Also, the output data ($O_1$ to $O_N$) generated are in various formats, with a plurality of data attributes that define each parameter for the code being tested. It could become cumbersome for a product manager or a test manager to go through every report format to assess code quality. Thus, in an embodiment of the disclosure, the output data generated by the tool chain setup 102 can be analyzed to be able to be drilled down or rolled up, from a file level to a module level to assess code quality.

According to an embodiment of the disclosure, system 100 further comprises a parser module 106. The parser module 106 is configured to parse through the output data generated by the tool chain setup 102 that works in conjunction with the software development framework 104. The parser module 106 comprises an adaptive parser (106a), a learning and discovery engine (107) and a metadata builder (109) (displayed in FIG. 2A) that accesses the output data ($O_1$ to $O_N$) generated by the tool chain setup 102 and reads or parsers through the output data that comprises a plurality of formats. The parser of the parser module 106 consolidates reports and also prepares to generate a context sensitive report as defined by users through an input value received. The attributes of the report are also read and stored in memory 116. The parser reads through each detail of the output data, which for example is related to file level parameters to module level parameters. Since, the plurality of tools in the tool chain setup 102 comprise a tools that generate an output data comprising various measures data, measures values in a variety of formats. It becomes necessary to rationalize these measures and report formats according to the context of a user story and operations. The learning and discovery engine 107 uses the adaptive parser (106 A) to parse through a plurality of output data to discover new information or new measures and measures data that can be rationalized by the analysis module 110. The learning and discovery engine 107 conveys existence of a new metadata information to the metadata builder 109. Any new metadata such as a new unit of measures is input to a metadata builder 109. The metadata builder 109, comprises a set of metadata values extracted by the adaptive parser The metadata values mainly comprise but are not limited to measures data, unit of measures and measures value. The learning and discovery engine 107 reads through report formats and any new format with new metadata is extracted and stored in the metadata builder 109. Both the learning and discovery engine 107 and the metadata builder 109 form a learning mechanism that helps in effectively discovering new entities at the time of parsing the output data generated by the tool chain setup 102 through a learning mechanism.

For instance—a measures data could comprise number of lines of code with a corresponding value and measures value could comprise a 'Yes/No' or a Pass/Fail' value. The attributes and corresponding values of the measures are communicated to the metadata builder 109. Thus, the parser is able to extract an output data that can be at a granular level and this can be further rolled up and aggregated to represent result parameters/attributes for a module level of software application code. The attributes of the reports stored in memory 116 is used for future reference to perform comparison and analysis of empirical data by the analysis module 110.

According to an embodiment of the disclosure, further the parser of the parser module 106 can be configured by the software development teams to read and retrieve reports from an output data package generated by the tool chain setup 102. The parser 106 can be configured to comprise a syntax to access metrics related to output data generated by the tool chain setup 102. The parser is tool agnostic, wherein the parser can access output data generated in a plurality of formats, read through package level details and file level details of the output data in order to create a composite report to represent code quality parameters.

According to an embodiment of the disclosure, the system 100 further comprises an analysis module 110 and an input receiving module 108. The analysis module 110 is communicatively coupled to the input receiving module 108. The input receiving module 108 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, further the analysis module 110 stores the measures data and measures values parsed in the parser module 106. These details are assorted per tool and further per file or module level. In addition, metadata read by the parser 106 per output data per tool from the tool chain setup 102 may not be uniform or may differ in quality. This is rationalized and derived values of the measures data and values of the measures data are processed by the analysis module 110. The analysis module 110 has the ability to derive a unique set of metadata attributes that needs to be analyzed and displayed to the product owner. In an embodiment, for instance, the analysis module 110 can perform operations such as deriving a ratio of one or more attributes of the output data to derive a new metric for more focused analysis. Further, the input receiving module 118 is configured to receive user input to perform comparative analysis and benchmarking of output data. In an embodiment, user input received comprises at least of a minimum and maximum value, or a range of values or a qualitative parameter value. For example, an input parameter received via user input can be of a value 95% related to code quality per 1 k lines of code, whereas, if the output data parsed by the parser is 92%, the final analysis can be displayed to indicate that the output is not of satisfactory quality, even of the 92% value generated by the tool chain set 102 is deemed as a 'pass'. Thus, the input receiving module 110 can enable a product owner in decision making.

According to an embodiment of the disclosure, the analysis module 110 generates a results data that comprises a comparison, trend analysis of the metadata, measures and measures value after considering the user input received through the input receiving module 108. The analysis module 110 generates a confidence parameter, which is a numeric value that indicates at what stage of the demand to deploy cycle is the probability of failure in quality of a software build. A higher value could indicate that failure can be attributed to the user story and user story management aspect. A lower value could indicate an attribution in integration. Further, the analysis module can also perform a cross relation analysis of the result data to indicate trends and patterns. For instance—how many software builds have quality issues that could be attributed to user story and backlog management, who are the teams and the respective velocity that can be associated with that version of the build. This trend analysis per build per date to can be used by a product owner to check for quality progression across the lifecycle of software code delivery. In an embodiment, unit test results per module or per file can be traced by the build date to measure the quality.

Figure 4:
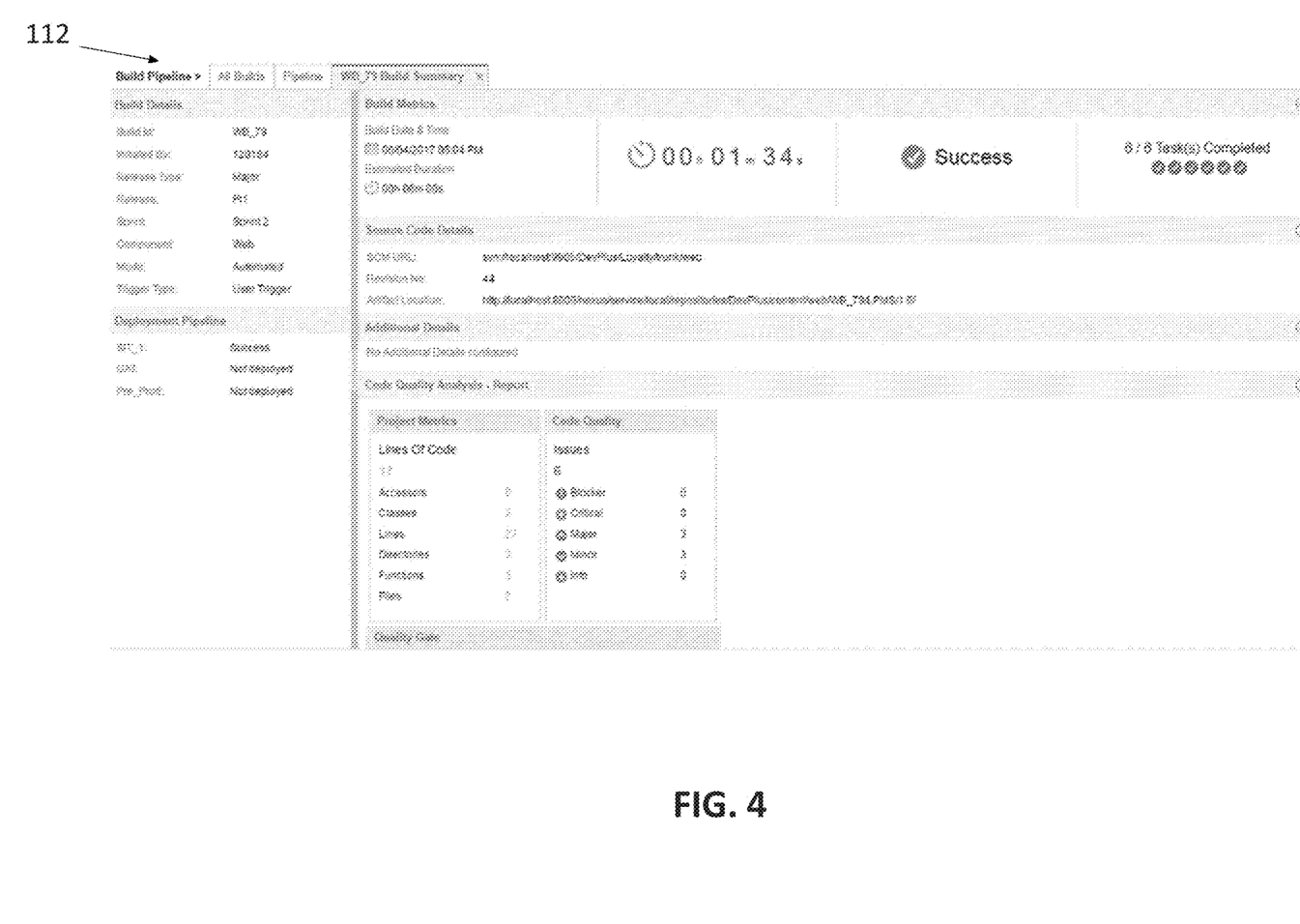
FIG. 4 illustrates a sketch of the output produced by the system according to an embodiment of the disclosure.

According to an embodiment of the disclosure, the system 100 further comprises an output module 112, where the composite set of metrics related to build quality are displayed to a user, such as a product manager on the display of the software development framework 104. Refer to FIG. 4 for an embodiment of the output module 112. The output module 112 displays qualitative and quantitative parameters for an aspect of the software development lifecycle. For instance, in an embodiment, Unit testing and Code quality check is a desired check in the build pipeline before deployment in various environments. The output module 112 generates a visual display—which also be drilled down to access individual results pertaining to unit testing for a package and also co-related to phases in the development cycle based on the confidence parameter generated by the analysis module 110. Attributes and values can be displayed using colour combinations to indicate trend and acceptability and also eligibility to advance in the software development lifecycle.

Figure 3:
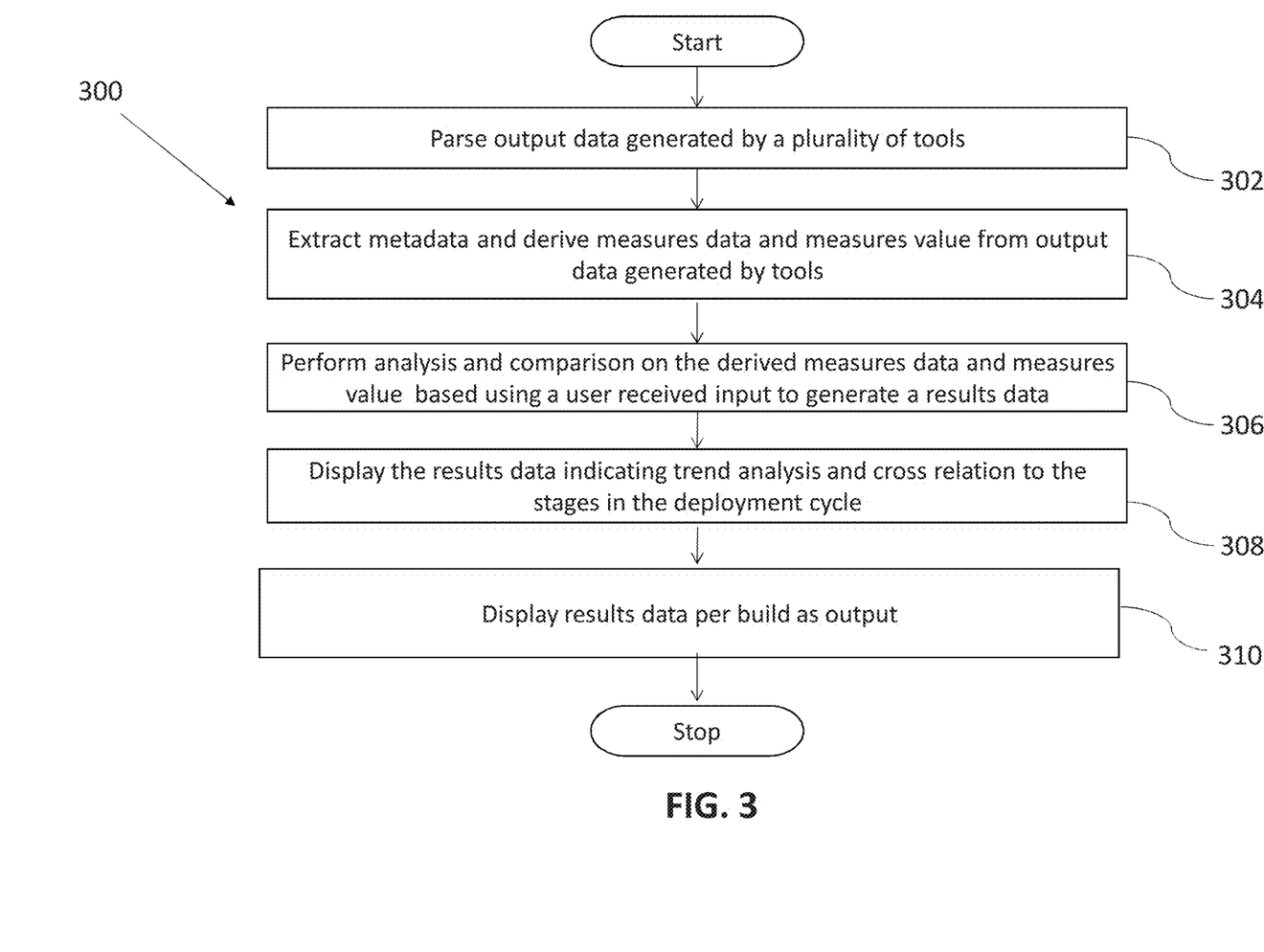
FIG. 3 illustrates a block diagram of the process of the tool chain data capture according to an embodiment of the disclosure.

In operation, a flowchart 300 illustrating the steps for capturing tool chain data in the agile or in an devops environment is shown in FIG. 3. Initially at step 302, output data generated by a plurality of tools used in the agile or devops cycle are parsed by a parser of the parsing module 106. The reports are parsed irrespective of report format. At step 304, metadata and measures data and measures values are extracted. In addition, additional parameters may be derived from the standard output data to create new parameters for a focus analysis. At step 306, the metadata and the measures data and measures values so derived are compared with input user criteria to form a results data for the environment in which the software code was tested by the tools. Further in step 306, the comparison also comprises using historical data for a particular build for a date and derived parameters of step 304 to generate a composite analysis of software code. In step 308, results data from the analysis also comprises a trend and pattern analysis that can be correlated to a stage on the development cycle to indicate a reduction in quality. Finally, in step 308 the results data is displayed on the software development framework to indicate quality parameters to enable decision making.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system (100) for selective capturing of tool chain data for software build analysis, the system comprising:
   a parser module (106) to extract data from a plurality of output data generated by at least one tool in the tool chain setup (102) associated with a software development framework (104) for a software build, wherein the plurality of output data comprises various measures data, measures values in a plurality of report formats, and wherein the parser module extracts the output data at a granular level, such that the extracted data can be rolled up and aggregated to represent result parameters/attributes for a module level of software application code;
   an input receiving module (108) to receive user input to analyse the data extracted by the parser module (106);
   an analysis module (110) to perform comparison and analysis and generate a result data on the data extracted by the parser module (106);
   an output module (112) to display the result data;

a memory (116); and a processor (118) in communication with the memory, the processor (118) is configured to perform the steps of:

parsing through a plurality of output data generated by a plurality of tools for a software deployment, wherein the plurality of tools is integrated with a plurality of stages in a deployment cycle, wherein the parsing comprises accessing the output data generated in the plurality of report formats, reading through package level details and file level details of the output data;

performing an analysis of the plurality of output data to generate a result data to indicate trend analysis and cross relation in the result data to the plurality of stages in the deployment cycle, wherein the analysis includes rationalizing and processing measures data and values of the measures data extracted by the parser module, and deriving a unique set of metadata attributes that needs to be analyzed and displayed;

generating an analysis report with the result data for decision making at any point in time in the software development process, wherein the analysis report provides an integrated view of a plurality of software testing parameters carried out for various software builds.

2. The system as claimed in claim 1, wherein the parser module (106) comprises:

a learning and discovery engine (107) that is configured to extract format data, the measures data and values of the measures data from the plurality of output data through a defined syntax; and a metadata builder (109) wherein metadata information contained in the plurality of output data is extracted, wherein the metadata information comprises measures, unit of measures generated in the plurality of output data.

3. The system as claimed in claim 2, wherein the learning and discovery engine (107) is configured to read and extract new format data and new measures data from newer formats of the plurality of output data generated by a plurality of tools.

4. The system as claimed in claim 1, wherein the analysis module (110) is configured to:

perform a comparison with a set of user input received by the input receiving module (108) or with the measures data and values of measures data extracted by the learning and discovery engine (107);

generate a result data subsequent to performing a comparison with a user input or with the measures data and values of measures data extracted by the learning and discovery engine (107);

generate a confidence parameter with the result data, wherein the confidence parameter is a numeric value indicating a probable cause of reduction in quality of the version of the software build; and perform a cross relation analysis of the result data to generate patterns that associate result data with a stage in the plurality of stages in the deployment cycle.

5. The system as claimed in claim 1, wherein the output module displays derived measures data extracted by the parser module (106) to indicate quality for the version of the software build.

6. A method for selective capturing of tool chain data for software build analysis, the method comprising a processor implemented steps of:

parsing through a plurality of output data generated by a plurality of tools for a software deployment, wherein the plurality of tools are integrated with a plurality of stages in a deployment cycle, wherein the plurality of output data comprises various measures data, measures values in a plurality of report formats, and wherein the parsing comprises accessing the output data generated in the plurality of report formats, reading through package level details and file level details of the output data, and wherein the parsing includes extracting the output data at a granular level, such that the extracted data can be rolled up and aggregated to represent result parameters/attributes for a module level of software application code;

performing an analysis of the plurality of output data to generate a result data to indicate trend analysis and cross relation in the result data to the plurality of stages in the deployment cycle, wherein the analysis includes rationalizing and processing parsed measures data and values of the measures data, and deriving a unique set of metadata attributes that needs to be analyzed and displayed;

generating an analysis report with the result data for decision making at any point in time in the software development process, wherein the analysis report provides an integrated view of a plurality of software testing parameters carried out for various software builds.

7. The method of claim 6, wherein the parsing further comprises implementing a parser for extracting metadata contained in at least one of the plurality of output data generated by at least one tool.

8. The method as claimed in claim 7, wherein the extracting metadata comprises extracting measure data, measurement data and measurement values from the plurality of output data, wherein the plurality of output data comprises at least one of console output, raw data, log file, partially analyzed data or final output generated by the at least one tool.

9. The method as claimed in claim 7, wherein the extracting metadata is performed through implementation of a learning and discovery engine on the plurality of output data.

10. The method as claimed in claim 6, wherein the performing an analysis of the plurality of output data comprises receiving a user input, wherein the user input comprises at least one of a minimum or maximum parameter value or a range of value and performing a comparison based on the user input and the measure data, measurement data and measurement values from the at least one of the plurality of output data to generate the result data.

11. The method as claimed in claim 10, wherein performing the analysis also comprises generating a confidence parameter and a cross relation analysis to indicate the cause of reduction in quality and to associate the result data to a stage in the plurality of stages of the deployment cycle.

12. A non-transitory computer-readable medium having embodied thereon a computer program for developing an Internet of Things (IoT) analytics application, the method comprising a processor implemented steps of:

extracting data from a plurality of output data generated by at least one tool in the tool chain setup (102) associated with a software development framework (104) for a software build;

receiving user input to analyse the data extracted;

performing comparison and analysis and generate a result data on the data extracted;

displaying the result data;

parsing through a plurality of output data generated by a plurality of tools for a software deployment, wherein the plurality of tools are integrated with a plurality of stages in a deployment cycle, wherein the plurality of output data comprises various measures data, measures values in a plurality of report formats, and wherein the parsing comprises accessing the output data generated in the plurality of report formats, reading through package level details and file level details of the output data, and wherein the parsing includes extracting the output data at a granular level, such that the extracted data can be rolled up and aggregated to represent result parameters/attributes for a module level of software application code;

performing an analysis of the plurality of output data to generate a result data to indicate trend analysis and cross relation in the result data to the plurality of stages in the deployment cycle, wherein the analysis includes rationalizing and processing parsed measures data and values of the measures data, and deriving a unique set of metadata attributes that needs to be analyzed and displayed; and generating an analysis report with the result data for decision making at any point in time in the software development process, wherein the analysis report provides an integrated view of a plurality of software testing parameters carried out for various software builds.

* * * * *